United States Patent Office 2,722,546
Patented Nov. 1, 1955

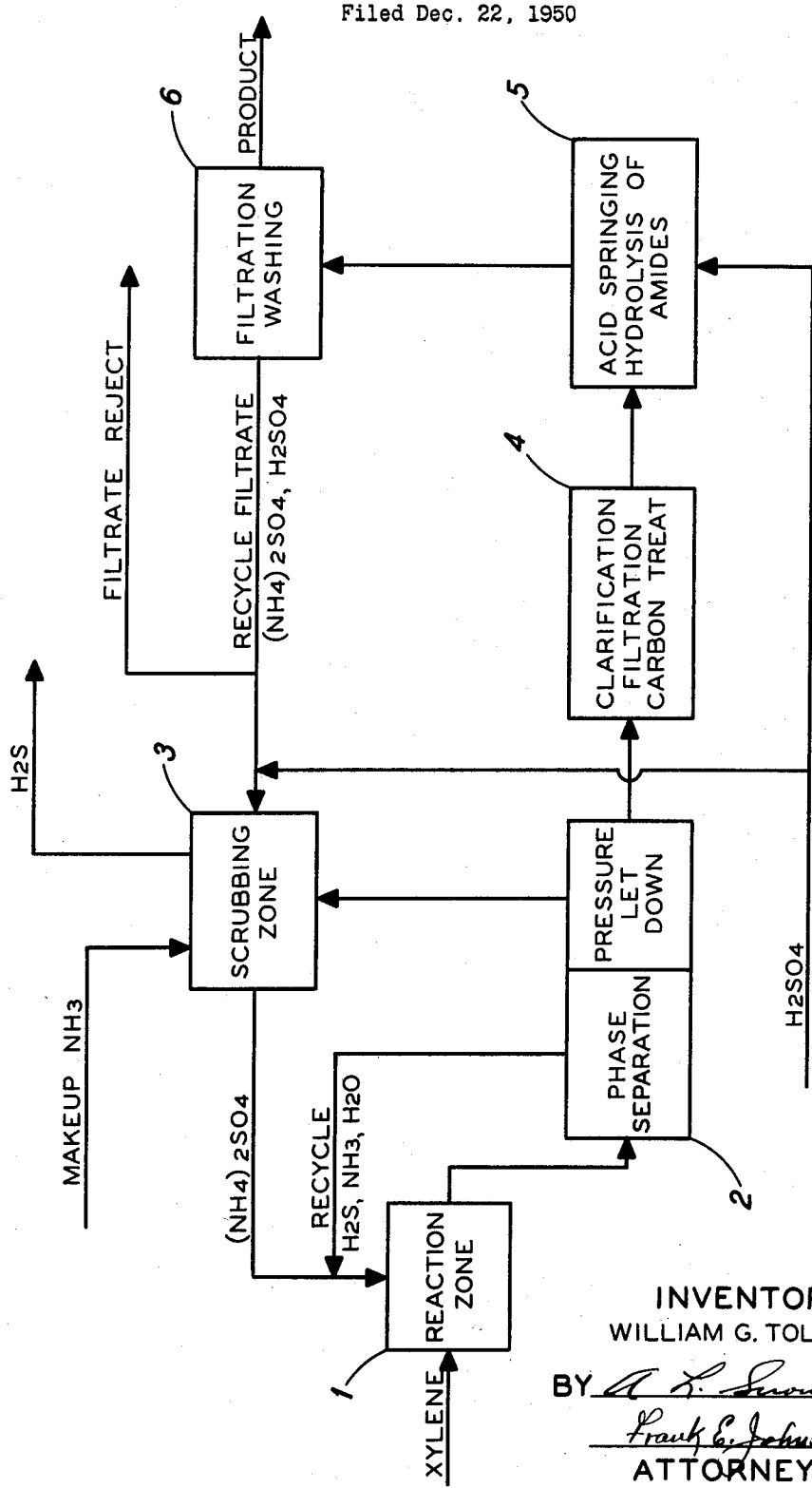

2,722,546

OXIDATION PROCESS

William G. Toland, Jr., Richmond, Calif., assignor to California Research Corporation, San Francisco, Calif., a corporation of Delaware Application December 22, 1950, Serial No. 202,389

11 Claims. (Cl. 260—524)

This invention relates to a process for oxidizing organic compounds.

Pursuant to the invention, an organic compound, a water-soluble sulfate, a water-soluble sulfur compound containing sulfur at a valence below plus 6, and water are introduced into a reaction zone and the mixture is there heated to an elevated temperature above 200° F. to effect oxidation of the organic compound.

All types of organic compounds appear to undergo oxidation when treated in this manner. Organic compounds containing at least one carbon-to-hydrogen bond, such as aliphatic hydrocarbons, aromatic hydrocarbons, amines, amides, aldehydes, ketones, esters, organic acids, and heterocyclic organic compounds are readily oxidized by the process of the invention. The process is especially effective for oxidizing hydrocarbons and organic compounds consisting of carbon, hydrogen, and oxygen atoms.

Any water-soluble sulfate may be employed in the oxidation process. However, it is preferred to employ water-soluble sulfates whose cations combine with sulfide ion to form water-soluble sulfides. Ammonium sulfate, alkali metal sulfates, the water-soluble alkaline earth metal sulfates, the alkali and alkaline earth hydrogen sulfates and sulfuric acid meet this requirement. Of the several preferred sulfates, ammonium sulfate has been found to be substantially more effective than the metallic sulfates and by its use optimum conversions and yields are obtained under any fixed set of reaction conditions. It is believed that the superior character of ammonium sulfate is related to the fact that the pH of the water solution of this sulfate and the sulfur compound containing sulfur at a valence below plus 6 is usually below 9 at room temperature. It has been noted that in comparable solutions where other sulfates are employed, pH values above 9 may be obtained and that the reaction proceeds less satisfactorily in these cases. In addition to this aspect ammonia liberated from ammonium sulfate during the reaction appears to solubilize hydrocarbon feeds and thus increase the intimacy of contact of the reactants.

The water-soluble sulfur compound containing sulfur at a valence below plus 6 is preferably an inorganic sulfur compound such as sulfur dioxide, a water-soluble sulfite, various water-soluble thiosulfates, and water-soluble sulfides such as hydrogen sulfide, ammonium sulfide, ammonium polysulfide, and the alkali metal sulfides and polysulfides. Of these materials, the sulfides and polysulfides are especially effective and are preferred.

The oxidation reaction is conducted at temperatures above 200° F. While there appears to be no upper temperature limit for the reaction, it is preferred to conduct the reaction at temperatures above 200° F. and below the critical temperature of water, desirably at temperatures in the range 300 to 700° F. and especially at temperatures in the range 400 to 650° F.

In the preferred embodiment of the invention, the oxidation reaction is conducted at an elevated pressure sufficient to maintain a part of the water introduced into the reaction zone in liquid phase, desirably at pressures in the range 200 to 5000 p. s. i. g.

The vigor and completeness of the oxidation reaction increases with temperature and the completeness of the oxidation of the organic compound tends to increase with reaction time. The extent of the oxidation with many organic compounds is controllable by varying time, ratio of reactants, and temperature of the reaction. For example, at temperatures in the range 500 to 650° F. for periods of ½ hour to 6 hours, substantial amounts of partially oxidized products are contained in the reaction product mixture; while at the higher temperatures and longer reaction times, more or all of the carbon contained in the organic compound can be converted to carbon dioxide.

The oxidation may be conducted either batchwise or in a continuous process. When batch operation is employed, the organic compound, the sulfate, the sulfide and water are introduced into a bomb or an autoclave which is then sealed and heated to reaction temperature with shaking to facilitate contact of the reactants. The size of the bomb is so related to the quantity of the reactants introduced that an autogenous pressure in the range 200 to 4000 p. s. i. g. is built up. After the reactants have been held at reaction temperature for a time sufficient to effect the desired degree of oxidation of the organic compound, the bomb is cooled, depressured, and the reaction product removed. The reaction may also be run continuously, in which case a tubular reaction zone is employed. The reactants are passed through an elongated heated tube at reaction temperature and under an elevated pressure and the reaction products are continuously withdrawn from the reaction zone and purified.

The appended drawing illustrates a preferred modification of the process of the invention. In starting the reaction, a hydrocarbon, for example, a xylene, ammonium sulfate, ammonium sulfide, and water are introduced into reaction zone 1. The reactants are heated in reaction zone 1 to a temperature in the range 500 to 700° F. for a time sufficient to effect partial oxidation of the xylene. The reaction product is removed from reaction zone 1, either intermittently or continuously, and charged to cooling and depressuring zone 2. In zone 2 separation of liquid and vapor phases is effected and a portion of the vapor phase comprising hydrogen sulfide, ammonia and water vapor is returned to reaction zone 1 for use in oxidation of further quantities of xylene. The reaction mixture in zone 2 is depressured and the reaction product gases other than those which have been recycled are passed into scrubbing zone 3 where the gas is scrubbed with sulfuric acid to remove ammonia and to form ammonium sulfate. The liquid product is removed from zone 2 and passed into clarification zone 4 where it is mixed with a small quantity of adsorbent charcoal and filtered to remove any color bodies which may have been formed. The filtrate from zone 4 is passed into hydrolysis zone 5 where it is treated with a strong acid, preferably sulfuric acid, and heated to hydrolyze acid amides and to liberate free phthalic acids from ammonium phthalates contained in the filtrate. The acidified liquid product is passed from zone 5 to filtration zone 6 where it is filtered to recover a filter cake comprising phthalic acids. At least part of the filtrate from zone 6 comprising ammonium sulfate and sulfuric acid is passed into scrubbing zone 3. Make-up ammonia is also introduced into scrubbing zone 3, the proportions of fresh ammonia, scrubbed ammonia and sulfuric acid being adjusted to yield an approximately neutral solution of ammonium sulfate which is recycled to reaction zone 1.

The following examples illustrate in detail the manner in which alkyl aromatic hydrocarbons may be oxidized to produce aromatic carboxylic acids by the process of the invention.

EXAMPLE 1

The apparatus employed in this experiment was a stainless-steel bomb having a capacity of 4 liters. The bomb was fitted with a pressure gauge, a thermowell, a bursting disk, a bleed line and valve, and a shaker. 160 g. of paraxylene (98.8% para), 305 g. of ammonium sulfate, 4.65 mols of ammonium sulfide in water solution having a volume of 700 cc., and 1150 cc., of water were introduced into the bomb. The bomb was sealed and heated to 600° F. and held at that temperature for one hour. The bomb was then cooled to room temperature, opened, and the reaction product was removed. The reaction product was stripped with steam, and filtered to remove approximately 1 g. sulfur. The filtrate was acidified with hydrogen chloride to precipitate the insoluble organic acids, and filtered. The filter cake was washed and dried. 69 g. of unreacted paraxylene were recovered during the steam stripping step. The filter cake weighed 102 g., had a neutral equivalent of 131, and a saponification equivalent of 113. The solid product consisted of terephthalic acid, toluic acid, and amides of both acids. The acid products contained 47% by weight of phthalic acids and their derivatives and 53% of toluic acids and their derivatives.

EXAMPLE 2

The procedure followed in Example 1 was repeated. The amounts of the reactants employed were the same. The only difference in the procedure was that the bomb was heated to 600° F. and held at that temperature for a period of 6 hours.

The filter cake recovered in this experiment weighed 240.6 g., had a neutral equivalent of 109 and a saponification equivalent of 81.8. The filter cake consisted essentially of terephthalic amides and acid.

The filtrate obtained in this experiment was evaporated and the residue was extracted with chloroform. The chloroform was evaporated and 10 g. of white solid material were recovered. This material consisted of toluic and benzoic acids.

The yield of phthalic acid was 96.2% of theory.

EXAMPLE 3

The apparatus employed in Example 1 was used in this experiment. The charge to the bomb consisted of 1 mol of paraxylene, 218 g. of ammonium sulfate, 800 cc. of water, and 200 g. of hydrogen sulfide. The bomb was heated to a temperature of 600° F. and held at a temperature in the range 583 to 606° F. for a period of 1½ hours. During this period the pressure in the bomb varied between 2400 and 2800 p. s. i. g.

The bomb was cooled to room temperature and opened. When the bomb was opened the gases escaping from the bomb were passed through a caustic scrubber. The scrubber showed a gain in weight of 200 g. when the passage of the gases from the bomb through it had been completed. This increase in weight is due almost entirely to absorption of hydrogen sulfide.

The liquid product was steam-stripped and filtered to remove sulfur. This filtrate was acidified with hydrochloric acid to precipitate phthalic acids. The acidified filtrate was filtered and the phthalic acid filter cake was washed and dried. The dry weight of this filter cake was 158 g. The filter cake had a neutral equivalent of 103 and a saponification equivalent of 82.8. The yield of phthalic acids was 149 weight per cent of the paraxylene charged.

The data from additional runs in which the specific composition of the oxidizing agent is varied are summarized in the following Table I:

*Table I*

| Run No. | Compound Oxidized | Oxidizing Agent | Total $H_2O$, cc. | Temp., °F. | Time, Hours | Pressure, p. s. i. g. | Products | Conversion, Mol Percent | Yield, Wt. Percent |
|---|---|---|---|---|---|---|---|---|---|
| 660-1 | Toluene (1 mol). | $NH_4HSO_4$ (1.5 mols) | 700 | 600 | 1.0 | 1,800 | Benzoic Acid | 8 | Low |
| 721/16 | Paraxylene (1.5 mols). | $H_2S$ (4.64 mols)<br>$(NH_4)_2SO_4$ (2.3 mols)<br>$NH_3$ (8.9 mols) | 1,850 | 600 | 1.0 | 2,800 | Terephthalic Acid NE 88.9 and Toluic Acid. | 89 | 128 |
| 721/20 | do | $(NH_4)_2S$ {6.3 mols $NH_3$, 3.3 mols $H_2S$}<br>$Na_2SO_4$ (4.6 mols) | 2,000 | 600 | 1.0 | 2,550 | Terephthalic Acid NE 118 and Toluic Acid. | 7.0 | 67 |

The following Table II indicates the nature of the oxidation reaction with a variety of other organic compounds at temperatures in the range 400 to 700° F. employing the oxidizing agents illustrated in the foregoing examples:

*Table II*

| Material | Temperature | Reaction Product |
|---|---|---|
| Toluic acid | 545 | Phthalic acids. |
| Caproic acid | 535–590 | Carbon dioxide. |
| Tetrahydrofuran | 530–575 | Do. |
| Do | 450 | Acetic acid, succinic acid, Butyric acid, $CO_2$. |
| Acetophenone | 580 | Benzoic acid. |
| Do | 450 | Phenylacetic acid. |
| Cyclohexanone | 555 | Phenol and $CO_2$. |
| α methyl naphthalene | 575–590 | α naphthoic acid. |
| p-tertiary-butyl toluene | 550–600 | p-tertiary-butyl benzoic acid. |
| Toluene | 600 | Benzoic acid. |
| Mesitylene | 600 | Trimesic acid. |
| Pseudocumene | 600 | Orthophthalic, Isophthalic and Terephthalic acids. |
| m-cymene | 600 | Isophthalic acid. |
| Benzyl alcohol | 600 | Benzoic acid. |
| Durene | 580–600 | Iso-terephthalic Acids. |
| 2,3-dimethyl butane | 600 | $CO_2$, Iso-butyric Acid. |
| n-hexane | 600 | $CO_2$, lower aliphatic acids. |
| n-octane | 600 | Lower aliphatic acids (NE 75–154). |
| 2,2,4-trimethyl pentane | 600 | Trimethyl acetic acid.<br>Trimethyl propionic acid. |
| 2,2,5-trimethyl hexane | 600 | Trimethyl acetic acid.<br>Trimethyl propionic acid. |
| Diamyl sulfide | 600 | Mixed acids, predominantly valeric acid (NE 95–110). |
| Di-isobutylene | 600 | Trimethyl acetic acid.<br>Trimethyl propionic acid. |
| Hemimellitene | 600 | Phthalic acids. |
| Methanol | 400–600 | $CO_2$. |
| Trimethylamine | | Methyl mercaptan. |
| Dodecene (propylene polymer) | | Aliphatic acids (NE 234.8). |
| Sucrose | | Acetic acid, $CO_2$. |
| n-butane | | Do. |

Obviously, many modifications and variations of the invention as hereinbefore set forth may be made without departing from the spirit and scope thereof, and only such limitations should be imposed as are indicated in the appended claims.

I claim:

1. A process for oxidizing organic compounds containing at least one carbon to hydrogen bond, which comprises heating the organic compound, a water-soluble salt of sulfuric acid, a water-soluble inorganic sulfur compound containing sulfur at a valence below plus 6 and water in a reaction zone to an elevated temperature in the range from 400 to 700° F. under a superatmospheric pressure sufficient to maintain a part of the water in liquid phase.

2. A process for oxidizing organic compounds containing at least one carbon to hydrogen bond which comprises introducing the organic compound, a water-soluble salt of sulfuric acid, a water-soluble sulfide and water into a reaction zone, heating the mixture to an elevated temperature above about 400° F. and maintaining in the reaction zone a pressure sufficient to hold a substantial proportion of the water in liquid phase.

3. A process for oxidizing organic compounds containing at least one carbon or hydrogen bond which comprises introducing the organic compound, ammonium sulfate, at least one sulfide of the group consisting of hydrogen sulfide, ammonium sulfide and ammonium polysulfide, and water into a reaction zone, heating the mixture to an elevated temperature above about 200° F. and below the critical temperature of water and maintaining a pressure in the reaction zone sufficient to hold a part of the water in liquid phase.

4. A process for oxidizing hydrocarbons which comprises introducing the hydrocarbon, ammonium sulfate, at least one sulfide of the group consisting of hydrogen sulfide, ammonium sulfide and ammonium polysulfide and water into a reaction zone, heating the mixture to an elevated temperature in the range 300 to 700° F. and maintaining a superatmospheric pressure in the reaction zone during the heating.

5. A process for oxidizing hydrocarbons which comprises heating a mixture of the hydrocarbon, ammonium sulfate, at least one sulfide of the group consisting of hydrogen sulfide, ammonium sulfide and ammonium polysulfide, and water in a reaction zone to an elevated temperature in the range from about 400° F. to 650° F. under a superatmospheric pressure sufficient to maintain a part of the water in liquid phase.

6. A process for oxidizing organic compounds which comprises introducing an organic compound containing at least one carbon to hydrogen bond, ammonium sulfate, at least one sulfide of the group consisting of hydrogen sulfide, ammonium sulfide and ammonium polysulfide, and water, into a reaction zone, heating the mixture to an elevated temperature above about 400° F. and below the critical temperature of water, maintaining a pressure in the reaction zone sufficient to hold a part of the water in liquid phase, passing the reaction product mixture into a cooling and depressuring zone, withdrawing a gaseous product comprising hydrogen sulfide and ammonia from the latter zone, scrubbing at least a part of said gaseous product with sulfuric acid in a scrubbing zone and returning ammonium sulfate from the scrubbing zone to the reaction zone.

7. A process for producing phthalic acids which comprises contacting xylenes with ammonium sulfate, at least one sulfide of the group consisting of hydrogen sulfide, ammonium sulfide and ammonium polysulfide, and water in a reaction zone at a temperature in the range 500 to about 650° F. under a superatmospheric pressure sufficient to maintain a part of the water in liquid phase.

8. A process for producing phthalic acids which comprises contacting xylenes with ammonium sulfate, at least one sulfide of the group consisting of hydrogen sulfide, ammonium sulfide and ammonium polysulfide, and water in a reaction zone at a temperature in the range 500 to about 650° F. under a superatmospheric pressure sufficient to maintain a part of the water in liquid phase, acidifying the reaction product and filtering it to recover a filter cake comprising phthalic acid amides, hydrolyzing the filter cake by heating it with aqueous sulfuric acid, filtering the hydrolyzate to separate phthalic acids and aqueous ammonium sulfate and returning at least a part of the ammonium sulfate to the reaction zone for use in oxidizing further quantities of xylenes.

9. A process according to claim 1 in which the organic compound is a xylene.

10. A process according to claim 1 in which the water-soluble inorganic sulfur compound containing sulfur at a valence below +6 is a water-soluble sulfite.

11. A process according to claim 1 in which the water-soluble inorganic sulfur compound containing sulfur at a valence below +6 is sulfur dioxide.

References Cited in the file of this patent

UNITED STATES PATENTS

| | | |
|---|---|---|
| 2,470,876 | Spindt et al. | May 24, 1949 |
| 2,537,297 | Alexander | Jan. 9, 1951 |

OTHER REFERENCES

Cavalieri et al.: J. Am. Chem. Soc., vol. 67, pp. 1783–6 (1945).

De Tar et al.: J. Am. Chem. Soc., vol. 68, pp. 2033–2035 (1947).

Zetterwall: "Chem. Abstracts," vol. 42, p. 2161 (1948).

Adams et al.: "Organic Reactions," vol. III, pp. 84–107 (1949).